United States Patent
Kammer

[15] 3,643,494
[45] Feb. 22, 1972

[54] A NONDESTRUCTIVE MEASURING SYSTEM

[72] Inventor: Erwin W. Kammer, McLean, Va.

[73] Assignee: The United States of America as represented by the Secretary of the Navy

[22] Filed: Sept. 15, 1969

[21] Appl. No.: 858,020

[52] U.S. Cl. .................................73/67.2, 73/67.8 R
[51] Int. Cl. .........................................G01n 29/00
[58] Field of Search..................................73/67.2

[56] References Cited

UNITED STATES PATENTS

| | | | |
|---|---|---|---|
| 2,605,633 | 8/1952 | Gow | 73/67.2 |
| 2,903,886 | 9/1959 | Renaut | 73/67.2 |
| 3,499,318 | 3/1970 | Bogdanov et al. | 73/67.2 |
| 2,439,130 | 4/1948 | Firestone | 73/67.8 |

*Primary Examiner*—Richard C. Queisser
*Assistant Examiner*—Arthur E. Korkosz
*Attorney*—R. S. Sciascia, Arthur L. Branning, M. L. Crane and R. J. Erickson

[57] ABSTRACT

A system for nondestructively measuring the thickness of a surface stress layer of a glass material by measuring an increase of the fundamental frequency of a quartz resonator due to the stressed surface layer.

2 Claims, 1 Drawing Figure

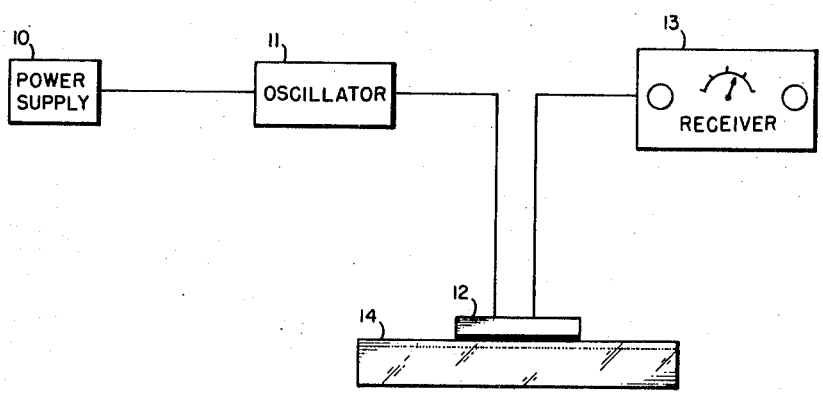
INVENTOR
ERWIN W. KAMMER

A NONDESTRUCTIVE MEASURING SYSTEM

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

This invention is directed to a system and method of nondestructively testing a glass material and more particularly to testing a glass material to determine the thickness of a surface layer in a state of compressive stress.

Heretofore, various systems have been used for nondestructive testing. Such systems determine thickness of a metal plate which may or may not have a backing, other systems determine thickness or flaws within an element tested. These prior art systems use an input which is varied over a specific range of frequencies to determine the resonant frequency of the test sample. From a determination of the resonant frequency the thickness or flaw may be determined.

SUMMARY OF THE INVENTION

Many glass materials may be made more resistant to failure initiated by the presence of surface cracks or flaws, if the surface layers are in a state of compressive stress.

It has been determined that the presence of transformed surface layers of polycrystalline glass such as "Pyroceram" increase the velocity of an ultrasonic wave as the compressional or shear wave is transmitted through the material. The elastic properties associated with an increase in velocity produces a fundamental frequency change in a bonded piezoelectric resonator which can be measured and then compared with a known scale to determine the thickness of the transformed surface layer. The system herein shown and described is suitable for applying an ultrasonic wave to a test material and then comparing the detected frequency of the wave received from the crystal with that of a known to determine thickness of the surface layer.

STATEMENT OF THE OBJECTS

It is therefore an object of the present invention to nondestructively determine the thickness of the outer surface layer of a material when this layer has distinctly different elastic parameters from the substrate.

Another object is to measure a glass material to determine the state of compressive stress of its outer surface and the thickness of the surface layer under stress.

Other objects and advantages of this invention will be obvious to those skilled in the art upon consideration of the following drawing and specification.

BRIEF DESCRIPTION OF THE DRAWING

The drawing is a block schematic diagram of an embodiment of the invention.

DETAILED DESCRIPTION

Now referring to the drawing, there is shown a block schematic diagram of a system for carrying out the invention. As shown, a power supply 10 such as a battery for portable equipment or any other suitable power source is connected to an oscillator-driver 11, preferably transistorized. The oscillator 11 is connected to a piezoelectric transducer 12 by input electrodes for impressing an adjustable frequency onto the transducer. The transducer is provided with output electrodes for determining an electrical output therefrom which is directed to a frequency measuring device such as a stable communication type radio receiver or resonance detector 13 which includes the necessary amplification circuitry. The oscillator frequency may be controlled by the piezoelectric transducer so the frequency supplied to the test sample is a characteristic frequency determined by the substrate or the modified surface coupled to the transducer. For situations in which the oscillator-resonator system is not operated as a self excited oscillator, then the oscillator frequency is adjusted to fundamental resonance frequency of the bonded transducer, this resonance condition being detected by a suitable modification in the receiver and the resonance frequency measured as before.

In operation, the transducer is bonded to the test sample 14 in which the portion above the dotted line represents the layer having changed elastic properties. A fundamental frequency in the range of 10 mc./s. or 5 mc./s. is applied to the transducer. The electrical oscillations are converted into mechanical vibrations by the piezoelectric crystal and the mechanical vibrations are transmitted into the test material. More rigid elastic properties of a transformed surface layer of the test material will be evident from an increase in the frequency of mechanical vibrations at which the transducer can be resonant. The output from the transducer is directed to a commercial type radio receiver or frequency counter which is then tuned to the output frequency of the transducer to provide a measure of the output. Any other frequency monitor or resonance detector may be used to determine the frequency output; however, the commercial type radio has been specified to provide an inexpensive type monitor.

In carrying out the teaching of the invention, the transducer system is bonded to the surface of a glass material which has not been treated and the frequency output is recorded. The same transducer is then bonded to like glass materials which have been treated to known but different thicknesses of transformed surface layers to obtain a list of frequency outputs for the different known transformed layers. Thus, a test made on an unknown may be compared with the list previously obtained to determine the thickness of the transformed layer of an unknown thickness. It is essential that the bonded transducer be chosen such that the corresponding sonic wavelength in the test material be substantially greater than [about 50 times] the anticipated range of thickness to be measured.

It has been determined that X-cut or Y-cut quartz resonators having a diameter of one-half inch and with a fundamental frequency of 10 mc./s. or 5 mc./s. respectively are suitable for bonding to a lithium treated surface of "Pyroceram" to test for surface layer thickness. Such resonators displayed a sensitivity factor of +0.47 percent change in frequency for each mil layer thickness. Thus, a layer 6.5 mils thick correlates with a positive frequency change of over 300 kc./s. for a 10 mc. X-cut resonator, which is readily measurable with a stable communication type radio receiver.

A short discussion of transformed polycrystalline glass is found in an article, "Vibroanalysis of Materials" (Detection and Measurement of Residual Stress), by E. W. Kammer et al., Report of NRL Progress, Jan. and Mar. 1969, pages 24-26, and 19-20, respectively.

The system and method has been presented for testing a material to determine the thickness of a stressed surface layer. It is conceivable that applications may arise where the surface layer has become weaker elastically and would therefore have the affect of lowering the resonant frequency of the material. This system may be used for determining weaker surface layers by measuring a frequency which is less than that for a normal material. Therefore the system may be used for rejecting materials which processed to make the surface layer weaker than that of the normal untreated material.

Obviously many modifications and variations of the present invention are possible in the light of the above teachings. It is therefore to be understood that the invention may be practiced otherwise than as specifically described.

What is claimed and desired to be secured by Letters Patent of the United States is:

1. A method of nondestructively testing a material to determine the thickness of a stressed surface layer in the material which comprises, bonding one face of a transducer to a material to be tested, applying a constant oscillating voltage of an adjustable frequency to said transducer to produce a resonant fundamental frequency vibration in said transducer whereby said transducer produces a corresponding sonic wave in said test material, detecting and measuring an output frequency produced by said transducer, and comparing the measured output frequency with a known output frequency to determine thickness of a stressed surface layer on the material to which the transducer is bonded, wherein each mil layer thickness of a stressed surface layer results in an increased change in frequency of 0.47 percent.

2. A method as claimed in claim 1 wherein, said transducer is operative to produce a sonic wave length in the test material which is at least 50 times the anticipated layer thickness to be measured.

* * * * *